United States Patent
Thullen et al.

(10) Patent No.: US 8,309,643 B2
(45) Date of Patent: *Nov. 13, 2012

(54) POLYAMIDE MOULDING COMPOUND AND USE THEREOF

(75) Inventors: Helmut Thullen, Bonaduz (CH); Christian Rytka, Bonaduz (CH); Friedrich-Severin Buehler, Thusis (CH); Ralf Hala, Lindenberg (DE)

(73) Assignee: EMS-Chemie AG, Domat/EMS (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,369

(22) Filed: Aug. 4, 2010

(65) Prior Publication Data

US 2010/0297373 A1 Nov. 25, 2010

Related U.S. Application Data

(62) Division of application No. 11/775,571, filed on Jul. 10, 2007.

(30) Foreign Application Priority Data

Jul. 11, 2006 (EP) .................................. 06 014 372

(51) Int. Cl.
*C08K 3/40* (2006.01)
(52) U.S. Cl. ........ 524/494; 524/425; 524/445; 524/447; 524/449; 524/451
(58) Field of Classification Search .................. 524/494, 524/449, 445, 447, 451, 425
See application file for complete search history.

(56) References Cited

U.S. PATENT DOCUMENTS

| | | | | |
|---|---|---|---|---|
| 4,528,304 A | * | 7/1985 | Yoshimura et al. | 523/216 |
| 6,191,207 B1 | * | 2/2001 | Fujii et al. | 524/494 |
| 6,204,355 B1 | * | 3/2001 | Torre et al. | 528/310 |
| 6,277,911 B1 | * | 8/2001 | Torre | 524/606 |
| 6,943,231 B2 | | 9/2005 | Buhler | |
| 7,763,674 B2 | | 7/2010 | Gijsman et al. | |
| 2002/0128377 A1 | * | 9/2002 | Torre et al. | 524/600 |
| 2003/0235666 A1 | | 12/2003 | Buhler | |
| 2004/0102559 A1 | * | 5/2004 | Oyamada et al. | 524/445 |

FOREIGN PATENT DOCUMENTS

| | | |
|---|---|---|
| EP | 0 337 443 | 10/1989 |
| KR | 10-2006 0056946 | 5/2006 |
| WO | WO 2005/104985 | 11/2005 |

OTHER PUBLICATIONS

Kirk-Othmer Encyclopedia of Chemical Technology: Polyamides, General, 2000.
Solvay Advanced Polymers L.L.C., Product Data IXEF 2030, 2005, Internet, URL:Http://solvayadvancedpolymers.com/static/wma/pdf/8/4/0/6/IXEF%202030.pdf.
Office Action for related Korean Patent Application No. 10-2007-0068488 dated Jan. 20, 2012.
English Translation of Office Action for related Korean Patent Application No. 10-2007-0068488 dated Jan. 20, 2012.

\* cited by examiner

*Primary Examiner* — Peter Szekely
(74) *Attorney, Agent, or Firm* — Millen, White, Zelano, Branigan, P.C.

(57) ABSTRACT

The present invention relates to polyamide moulding compounds which have very low distortion with good mechanical properties. This is achieved by a combination of transparent polyamide with fibrous reinforcing materials and also particulate fillers. The moulding compounds according to the invention are used for the production of any moulded articles, semi-finished products or finished products.

19 Claims, No Drawings

POLYAMIDE MOULDING COMPOUND AND USE THEREOF

This application is a divisional application of U.S. patent application Ser. No. 11/775,571, filed Jul. 10, 2007.

The present invention relates to polyamide moulding compounds which have very low distortion with good mechanical properties. This is achieved by a combination of transparent polyamide with fibrous reinforcing materials and also particulate fillers. The moulding compounds according to the invention are used for the production of any moulded articles, semi-finished products or finished products.

Polyamides are widespread nowadays as structural elements for the interior and exterior sphere, which can be attributed essentially to the outstanding mechanical properties.

An improvement in the mechanical properties, such as strength and rigidity, can be achieved in particular by the addition of fibrous reinforcing materials, e.g. glass fibres. However frequently increased distortion of the moulded parts is associated with the addition of fibrous reinforcing materials. The consequence of this is that only small contents of fibrous reinforcing materials, or rather only isotropic fillers, such as glass balls, can be used if distortion is regarded as a critical parameter for the moulded part. The moulding compounds obtained in this way then have only a low modulus of elasticity in tension in the moulded part.

The addition of particulate fillers effects, on the one hand, a reduction in the distortion but leads, on the other hand, to an impairment with respect to the mechanical properties, such as strength and breaking elongation.

Starting herefrom, it was the object of the present invention to provide polyamide moulding compounds with which there can be produced moulded articles with good mechanical properties and at the same time low distortion and which do not have the previously described disadvantages of the state of the art.

This object is achieved with respect to the polyamide moulding compound by the features of claim 1, with respect to the moulded articles by the features of claim 15 and with respect to use by the features of claim 20. The further dependent claims reveal advantageous developments.

The polyamide moulding compound according to the invention comprises 40 to 79% by weight at least of a transparent polyamide, 15 to 49% by weight at least of a fibrous reinforcing material and 6 to 30% by weight of a particulate filler. In addition, further additives can be contained as complement to 100% by weight. Preferred compositions comprise 40 to 69% by weight, preferably 40 to 55% by weight, of the transparent polyamide, 25 to 49% by weight, preferably 30 to 49% by weight, of the fibrous reinforcing material, 6 to 30% by weight of the particulate filler and also if necessary, as complement to 100% by weight, at least one further additive. However there should not be understood as additives within the scope of the present invention polyamide oligomers.

A particular feature of the present invention is that good mechanical properties can be achieved by moulded articles produced herefrom by the claimed combination on the one hand and the moulded articles according to the invention have at the same time a substantially lower distortion in comparison with known moulded articles.

With respect to the fibrous reinforcing materials, basically no restrictions exist. Preferably, these are selected from the group comprising glass fibres, carbon fibres, metal fibres, aramide fibres, whiskers and mixtures thereof. There should be understood by whiskers needle-like monocrystals comprising metals, oxides, borides, carbides, nitrides, polytitanate, carbon etc. with a generally polygonal cross-section, e.g. potassium nitanate-, aluminium oxide-, silicon carbide-whiskers. In general, whiskers have a diameter of 0.1 to 10 µm and a length in the mm to cm range. At the same time, they have high tensile strength. Whiskers can be produced by deposition from the gas phase in the solid (VS mechanism) or from a three-phase system (AILS mechanism).

The glass fibres preferably have a diameter of 5 to 20 µm and particularly preferred of 5 to 10 µm. Preferably, glass fibres with a round, oval or rectangular cross-section are used. The glass fibres thereby comprise preferably E-glass. The glass fibres can thereby be added as endless fibres or as cut glass fibres, the fibres being able to be equipped with a suitable sizing system and a bonding agent or bonding agent system, e.g. on a silane basis.

All the fillers known to the person skilled in the art are possible as particulate fillers. There are included herein in particular particulate fillers selected from the group comprising talcum, mica, silicates, quartz, titanium dioxide, wollastonite, kaolin, silicic acids, magnesium carbonate, magnesium hydroxide, chalk, ground or precipitated calcium carbonate, lime, feldspar, barium sulphate, permanently magnetic or magnetisable Metals or alloys, glass balls, hollow glass balls, hollow spherical silicate fillers and mixtures thereof.

Transparent polyamides in the sense of the present invention are polyamides which have a defined light transmission.

In particular the polyamides, the light transmission of which is at least 70%, are included herein if the polyamide is present in the form of a plate, e.g. a round plate, with a thickness of 2 mm. Round plates of 75×2 mm are produced on an Arburg injection moulding machine in the polished mould, the cylinder temperature being between 240 and 340° C. and the mould temperature between 20 and 140° C. The measurement of the light transmission is implemented according to ASTM D 1003-61 on the measuring apparatus Haze Gard plus by the Byk Gardner company with CIE light type C at 23° C. The light transmission value is thereby indicated in % of the irradiated light quantity.

Preferably transparent polyamides which have a light transmission of at least 86%, particularly preferred of at least 90%, are used.

No restrictions exist with respect to the composition of the transparent polyamides so that all the transparent polyamides or mixtures thereof which are known to the person skilled in the art can be used. There are included herein in particular the polyamides which are produced from at least one diamine and at least one dicarboxylic acid and/or at least one amino acid or a lactam. There are preferred hereby as diamine aliphatic and/or cycloaliphatic diamines with 6 to 17 C-atoms and/or diamines ($C_6$-$C_{17}$) with partially aromatic structures. There are used preferably as dicarboxylic acids aliphatic and/or aromatic dicarboxylic acids with 6 to 12 C-atoms. The amino acids are selected preferably from the group of $\alpha$, $\omega$ amino acids with 6 to 12 C-atoms. The lactams are preferably selected from the group of lactams with 6 to 12 C-atoms.

The transparent polyamides have a relative viscosity of 1.36-1.80, preferably 1.36-1.74, particularly preferred 1.41-1.69. The relative viscosity is thereby determined according to DIN EN ISO 307, in 0.5% m-cresol solution at 20° C.

The transparent polyamides have a glass transition temperature (Tg) of at least 120° C., preferably at least 130° C. The glass transition temperature is thereby determined by means of differential scanning calorimetry (DSC) at a heating rate of 20° C./min according to the ISO standard 11357-1/-2. The temperature at the turning point is indicated.

Transparent, amorphous polyamides are preferred. There are included herein in particular the polyamides which, in the dynamic differential scanning calorimetry (DSC) according to ISO 1357-1/-2, at a heating rate of 20° C./min, have a melting heat of at most 5 J/g, preferably at most 3 J/g and particularly preferred at most 1 J/g.

The transparent amorphous polyamides are produced preferably from at least one diamine and at least one dicarboxylic acid and/or at least one amino acid or a lactam. Aliphatic and/or cycloaliphatic diamines with 6 to 17 C-atoms and/or diamines ($C_6$-$C_{17}$) with partially aromatic structures are preferred as diamine. There are used preferably as dicarboxylic acids aliphatic and/or aromatic dicarboxylic acids with 6 to 12 C-atoms. The amino acids are selected preferably from the group α, ω amino acids with 6 to 12 C-atoms. The lactams are selected preferably from the group of lactams with 6 to 12 C-atoms The transparent amorphous polyamides have a relative viscosity of 1.36-1.80, preferably 1.36-1.74, particularly preferred 1.41-1.69. The relative viscosity is thereby determined according to DIN EN ISO 307, in 0.5% m-cresol solution at 20° C.

The transparent amorphous polyamides have a glass transition temperature (Tg) of at least 120° C.; preferably at least 130° C. The glass transition temperature is thereby determined by means of differential scanning calorimetry (DSC) at a heating rate of 20° C./min according to the ISO standard 11357-1/-2. The temperature at the turning point is indicated.

Preferred transparent amorphous polyamides are selected from the following group: PA 6I, PA 6I/6T, PA MXDI/6I, PA MXDI/MXDT/6I/6T, PA MXDI/12I, PA MXDI, PA MACM12, PA MACMI/12, PA MACMI/MACMT/12, PA 6I/MACMI/12, PA 6I/6T/MACMI/MACMT, PA 6I/6T/MACMI/MACMT/12, PA MACM6/11, PA MACMI/MACM12 and mixtures thereof. The MACM can thereby be replaced by PACM up to 55% by mol, in particular up to 50% by mol.

In specially preferred embodiments there are used as base material. MACM-containing transparent amorphous polyamides or mixtures thereof which have respectively a relative viscosity of 1.41-1.69, preferably 1.49-1.69. Their glass transition temperature is at least 130° C., preferably at least 145° C.

In a further particular embodiment, a transparent amorphous polyamide is used as base material from the group MACM12, MACMI/12 and mixtures thereof which have respectively a relative viscosity of 1.41-1.69, preferably 1.49-1.69. Their glass transition temperature is at least 130° C., preferably at least 145° C.

Of course the thermoplastic polyamide moulding compounds according to the invention can contain in addition normal additives which are known in general to the person skilled in the art and are selected from the group comprising impact strength modifiers, preferably so-called MBS or core-outer layer impact strength modifiers, e.g. based on methacrylate-butadiene-styrene, bonding agents, halogen-containing flameproofing agents, halogen-free flameproofing agents, stabilisers, age-protecting agents, antioxidants, antiozonants, light protection agents, UV stabilisers, UV absorbers, UV blockers, inorganic heat stabilisers, organic heat stabilisers, conductivity additives, carbon black, optical lighteners, processing aids, nucleation agents, crystallisation accelerators, crystallisation inhibitors, flow aids, lubricants, mould-release agents, softeners, pigments, colourants, marking materials and mixtures thereof.

The polyamide moulding compounds according to the invention can contain, for specific purposes, in addition also other polymers, such as polyolefins, AN polymers, functionalised copolyolefins and ionomers.

Further embodiments provide that the polyamide moulding compound contains from 21 to 60% by weight, preferably from 31 to 60% by weight, specially preferred from 45 to 60% by weight, particularly preferred from 45 to 55% by weight, of the fibrous reinforcing materials and the particulate fillers in total.

The reinforcing materials are always present in at least the same quantity (% by weight) as the fillers.

The invention comprises in addition moulded articles produced with the above-described moulding compound. These moulded articles preferably have a distortion of ≦2.7%, particularly preferred ≦2.3%. It should be emphasised thereby that, despite this low distortion, the mechanical properties of the moulded articles remain unaffected. Thus the moulded article preferably has a modulus of elasticity in tension of ≧8000 MPa, in particular ≧10000 MPa. With respect to the tensile strength, values ≧100 MPa, and in particular ≧140 MPa are preferred.

The polyamide moulding compound preferably has a breaking elongation of ≧1.5%, particularly preferred ≧2.0%.

Finally the invention also relates to the use of the above-described moulding compounds for the production of distortion-free moulded articles. The moulded articles are hereby selected preferably from the group comprising precisely fitting parts, mutually moveable parts, functional elements, operating elements, tracking elements, adjustment elements, carrier elements, frame elements, switches and housings in the field of electrics, electronics, energy and drive technology, mechanical engineering, automobiles, furniture, sport, sanitary, hygiene, medical technology, transport means, telecommunications, entertainment electronics, domestic appliances or electrical tools, produced by injection moulding, extrusion or other shaping technologies, e.g. functional carriers in the cockpit area of an automobile, frame components of a sewing machine, mobile phone housings.

The production of the polyamide moulding compounds according to the invention can be effected on normal compounding machines, such as e.g. single or twin-screw extruders or screw kneaders. As a rule, initially the polymer component is melted and the reinforcing material and/or filler is fed into the melt at any points of the extruder, e.g. by means of a side feeder. The compounding is effected preferably at set cylinder temperatures of 260° C. to 320° C. The polymer component and the reinforcing material and/or filler can however also all be metered into the feed.

The present invention is intended to be explained in more detail with reference to the subsequent examples without wishing to restrict the latter by the special embodiments shown here.

The moulding compounds were produced on a twin-screw extruder of the company Werner & Pfleiderer, type ZSK 25. Both the polyamide granulates and the mineral were thereby metered into the feed via separate scales. The glass fibre was conveyed into the polymer melt via a side feeder 6 housing units before the nozzle.

The temperature of the first housing was set at 100° C., that of the remaining housings at 280° C. A speed of rotation of 200 rpm and a throughput of 10 kg/h was used and degassed atmospherically. The strands were cooled in the water bath, cut and the obtained granulate was dried at 120° C. for 24 h.

The thus produced moulding compounds were processed as follows into test bodies and tested.

Processing

The standard test bodies were produced on an injection moulding machine of the Arburg company, model Allrounder 320-210-750 Hydronica. In the case of moulding compounds without PA 66, a material temperature of 275-300° C. and a mould temperature of 80° C. was used. In the case of moulding compounds with PA 66, 300-308° C. and 100° C.

"Visitor card holders" were produced on an injection moulding machine of the Ferromatik company, model K85 D-S/2F, at set cylinder temperatures of 270-290° C. and a mould temperature of 80-100° C.

Tests

Distortion:

The distortion was determined by means of an injection-moulded "Visitor card holder" (see FIG. 1 in this respect). After storage of 14 days in a normal atmosphere (23° C., 50% relative humidity), the width is measured and compared to the mould dimension (width of the cavity 90.2 mm). The greater the difference, the greater is the distortion.

Modulus of elasticity in tension:

ISO 527 at a tension rate of 1 mm/min

ISO-test bar, standard: ISO/CD 3167, type A1, 170×20/10×4 mm, temperature 23° C.

Tensile strength and breaking elongation:

ISO 527 at a tension rate of 50 mm/min

ISO-test bar, standard: ISO/CD 3167, type A1, 170×20/10×4 mm, temperature 23° C.

Impact strength according to Charpy:

ISO 179/1eU

ISO-test bar, standard: ISO/CD 3167, type B1, 80×10×4 mm, temperature 23° C.

Notch-impact strength according to Charpy:

ISO 179/1eA

ISO-test bar, standard: ISO/CD 3167, type B1, 80×10×4 mm, temperature 23° C.

All the test bodies, apart from the "Visitor card holders", were used in the dry state. For this purpose, the test bodies were stored after the injection moulding for at least 48 h at room temperature in dry surroundings.

EXAMPLES AND COMPARATIVE EXAMPLES

The following abbreviations are used in the following:

| ABS | Acrylnitrile-butadiene-styrene-copolymer |
|---|---|
| IPS | Isophthalic acid (I) |
| LC-12 | Laurinlactam |
| MACM | Bis-(4-amino-3-methyl-cyclohexyl)methane |
| PC | Polycarbonate |
| TPS | Terephthalic acid (T) |
| RV | Relative viscosity |

The materials used in the examples are listed in Table 1.

TABLE 1

| Material | Trade name | Relative viscosity at 20° C. m-cresol, 0.5% | Characterisation | Light transmission (2 mm plates) [%] | Manufacturer |
|---|---|---|---|---|---|
| MACM12 | — | 1.67 | *—/50/—/—/50 | 93.5 | — |
| MACMI/12 | — | 1.55 | *—/32.4/32.4/—/34.6 | 92 | — |
| 6I/6T/MACMI/MACMT | — | 1.45 | *42.9/7.6/44.5/5.0/— | 91 | — |
| 6I/6T | — | 1.41 | *50.2/—/33.2/16.6/— | 91 | — |
| PC/ABS | Bayblend T88-4N** | — | — | — | Bayer AG, Germany |
| PA 66 | Ultramid S2701 | 2.70 in H2SO4, 1% | — | — | BASF AG, Germany |
| PA6 | GRILON A28 | 2.75 in H2SO4, 1% | — | — | EMS-CHEMIE AG, Switzerland |
| Glass fibres | Vetrotex 995 EC10-4.5 | — | E-Glass Diameter 10 mic Length 4.5 mm | — | Saint-Gobain Vetrotex, France |
| Calcium carbonate | MILLICARB-OG | — | Calcium carbonate, ground | — | Omya AG, Switzerland |
| Kaolin | Quality China Clay | — | Aluminium silicate | — | ECC International, Great Britain |

*HMD/MACM/IPS/TPS/LC-12 in mol %
**20% by weight glass fibres

Table 2 shows the composition of examples 1 to 5 according to the invention and the herewith associated test results with respect to the distortion and mechanical properties.

Table 3 shows the composition of examples 6 to 10 according to the invention with associated distortion and mechanical properties.

Table 4 shows the composition of the comparative examples 11 to 16 with associated test results.

Table 5 shows the composition of the comparative examples 17 to 19 with associated test results,

TABLE 2

| Materials | Unit | Examples Number | | | | |
|---|---|---|---|---|---|---|
| | | 1 | 2 | 3 | 4 | 5 |
| MACM12 | % by weight | 40 | 55 | 40 | 40 | 50 |
| MACMI/12 | % by weight | — | — | — | — | — |
| 6I/6T/MACMI/MACMT | % by weight | — | — | — | — | — |
| 6I/6T | % by weight | — | — | — | — | — |
| Glass fibres | % by weight | 30 | 30 | 30 | 40 | 40 |
| Calcium carbonate | % by weight | 30 | 15 | — | 20 | 10 |
| Kaolin | % by weight | — | — | 30 | — | — |
| Tests | | | | | | |
| Distortion | % | 2.05 | 1.59 | 2.05 | 2.09 | 2.70 |
| Modulus of elasticity in tension | MPa | 10230 | 8110 | 10630 | 11760 | 10260 |
| Tensile strength | MPa | 144 | 141 | 110 | 149 | 147 |
| Breaking elongation | % | 2.5 | 3.2 | 1.6 | 2.3 | 2.6 |
| Impact strength | kJ/m$^2$ | 34 | 56 | 16 | 37 | 45 |
| Notch-impact strength | kJ/m$^2$ | 8 | 11 | 4 | 9 | 11 |

TABLE 3

| Materials | Unit | Examples Number | | | | |
|---|---|---|---|---|---|---|
| | | 6 | 7 | 8 | 9 | 10 |
| MACM12 | % by weight | — | — | — | 40 | 45 |
| MACMI/12 | % by weight | — | — | 50 | — | — |
| 6I/6T/MACMI/MACMT | % by weight | 50 | — | — | — | — |
| 6I/6T | % by weight | — | 50 | — | — | — |
| Glass fibres | % by weight | 40 | 40 | 40 | 49 | 49 |
| Calcium carbonate | % by weight | 10 | 10 | 10 | 11 | 6 |
| Kaolin | % by weight | — | — | — | — | — |
| Tests | | | | | | |
| Distortion | % | 1.69 | 1.27 | 2.28 | 2.19 | 2.51 |
| Modulus of elasticity in tension | MPa | 14020 | 14630 | 11420 | 13770 | 13040 |
| Tensile strength | MPa | 208 | 221 | 164 | 165 | 150 |
| Breaking elongation | % | 2.2 | 2.4 | 2.4 | 2.2 | 2.1 |
| Impact strength | kJ/m$^2$ | 37 | 36 | 37 | 40 | 38 |
| Notch-impact strength | kJ/m$^2$ | 8 | 9 | 9 | 11 | 13 |

TABLE 4

| Materials | Unit | Comparative examples Number | | | | | |
|---|---|---|---|---|---|---|---|
| | | 11* | 12 | 13 | 14 | 15 | 16 |
| PC/ABS | % by weight | 80 | — | — | — | — | — |
| MACM12 | % by weight | — | 70 | — | — | — | — |
| PA66 | % by weight | — | — | 60 | 40 | 51 | 43 |
| PA6 | % by weight | — | — | — | — | 9 | 6 |
| Glass fibres | % by weight | 20 | 30 | 30 | 30 | 30 | 30 |
| Calcium carbonate | % by weight | — | — | 10 | — | 10 | — |
| Kaolin | % by weight | — | — | — | 30 | — | 30 |
| Tests | | 11 | 12 | 13 | 14 | 15 | 16 |
| Distortion | % | 2.75 | 3.33 | 6.09 | 5.14 | 6.56 | 3.99 |
| Modulus of elasticity in tension | MPa | 5900 | 6450 | 11380 | 13650 | 10850 | 15010 |
| Tensile strength | MPa | 77 | 122 | 187 | 131 | 187 | 137 |

TABLE 4-continued

| | | | | | | | |
|---|---|---|---|---|---|---|---|
| Breaking elongation | % | 2.0 | 3.9 | 3.2 | 1.5 | 3.7 | 1.4 |
| Impact strength | kJ/m² | — | 61 | 82 | 24 | 95 | 27 |
| Notch-impact strength | kJ/m² | — | 11 | 10 | 3 | 12 | 4 |

*Bayblend T88-4N

TABLE 5

| | | Comparative examples Number | | |
|---|---|---|---|---|
| | Unit | 17 | 18 | 19 |
| Materials | | | | |
| PC/ABS | % by weight | — | — | — |
| MACM12 | % by weight | 60 | — | — |
| PA66 | % by weight | — | 50 | 45 |
| PA6 | % by weight | — | — | — |
| Glass fibres | % by weight | 40 | 40 | 49 |
| Calcium carbonate | % by weight | — | 10 | 6 |
| Kaolin | % by weight | — | — | — |
| Tests | | | | |
| Distortion | % | 3.27 | 5.32 | 5.11 |
| Modulus of elasticity in tension | MPa | 8730 | 14208 | 16520 |
| Tensile strength | MPa | 146 | 217 | 241 |
| Breaking elongation | % | 3.4 | 3.0 | 2.7 |
| Impact strength | kJ/m² | 64 | 92 | 105 |
| Notch-impact strength | kJ/m² | 14 | 13 | 16 |

The "Visitor card holders" produced from the moulding compounds of the examples according to the invention show without exception a lower distortion than those made of the moulding compounds of the comparative examples.

The test bodies made of the moulding compound no. 11 with an amorphous PC/ABS blend as basis (Bayblend T88-4N, a commercial product by Bayer AG) show in fact the lowest distortion in the comparative examples but even this is still higher than that of the test bodies made of the moulding compounds according to the invention.

The test bodies made of the comparative moulding compounds (nos. 13-16 and 18, 19) which are based on partially crystalline polyamides have a significantly higher distortion still.

Even the test bodies made of solely reinforced comparative moulding compounds with an amorphous polyamide as basis (nos. 12 and 17) have higher distortion than those of the moulding compounds according to the invention with reinforcing materials and fillers.

The comparative examples show in addition that high moduli of elasticity in tension generally are accompanied by high distortion.

In this context, the moulding compound no. 11 in fact provides the test bodies with the lowest distortion within the comparative examples but these also have the lowest modulus of elasticity in tension.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 06 014 372.4, filed Jul. 11, 2006, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A polyamide molding compound comprising
40 to 79% by weight of only one transparent amorphous polyamide, wherein the polyamide is a homo- or copolyamide selected from the group consisting of PA MACMI/MACMT/12, PA 6I/MACMI/12, PA 6I/6T/MACMI/MACMT, PA 6I/6T/MACMI/MACMT/12, PA MACM6/11, PA MACMI/MACM12,
15 to 49% by weight at least of a fibrous reinforcing material and
6 to 30% by weight of a particulate filler, which is a silicate, quartz, titanium dioxide, a silicic acid, magnesium carbonate, magnesium hydroxide, chalk, ground or precipitated calcium carbonate, lime, feldspar, barium sulphate, a permanently magnetic or magnetizable metal or alloy, glass balls, hollow glass balls, or a hollow spherical silicate filler or a mixture thereof, and
also if necessary, as complement to 100% by weight, at least one further additive,
with the proviso that polyamide oligomers are excluded as additive.

2. The polyamide molding compound according to claim 1, which comprises 40 to 69% by weight of the transparent polyamide, 25 to 49% by weight of the fibrous reinforcing material and 6 to 30% by weight of the particulate filler, and also if necessary, as complement to 100% by weight, at least one further additive.

3. The polyamide molding compound according to claim 1, wherein the at least one fibrous reinforcing material is glass fibers, carbon fibers, metal fibers, aramide fibers, or whiskers or a mixture thereof.

4. The polyamide molding compound according to claim 3, wherein the glass fibers have a diameter of 5 to 20 µm.

5. The polyamide molding compound according to claim 3, wherein the glass fibers have a round, oval or rectangular cross-section.

6. The polyamide molding compound according to claim 3, wherein the glass fibers are made of E-glass.

7. The polyamide molding compound according to claim 1, wherein the at least one transparent polyamide has a light transmission, measured according to ASTM D 1003-61 on a plate comprising the polyamide with a thickness of 2 mm, of at least 70%.

8. The polyamide molding compound according to claim 1, wherein the at least one transparent polyamide has, in a differential scanning calorimetry, DSC according to ISO 1357-1/-2 at a heating rate of 20° C./mm, a melting heat of at most 5 J/g.

9. The polyamide molding compound according to claim 1, wherein the at least one further additive is selected from the group consisting of impact strength modifiers, bonding agents, halogen-containing flameproofing agents, halogen-free flameproofing agents, stabilizers, age-protecting agents, antioxidants, antiozonants, light protection agents, UV stabilizers, UV absorbers, UV blockers, inorganic heat stabilizers, organic heat stabilizers, conductivity additives, carbon black, optical lighteners, processing aids, nucleation agents, crystallization accelerators, crystallization inhibitors, flow aids, lubricants, mold-release agents, softeners, pigments, colorants, marking materials and mixtures thereof.

10. The polyamide molding compound according to claim 1, which contains 21 to 60% by weight of the at least one fibrous reinforcing material and the particulate filler in total.

11. A molded article produced from the polyamide molding compound according to claim 1.

12. The molded article according to claim 11, which has a distortion of less than or equal to 2.7%.

13. The molded article according to claim 11, which has a modulus of elasticity in tension of greater than or equal to 8000 MPa.

14. The molded article according to claim 11, which has a tensile strength of greater than or equal to 100 MPa.

15. The molded article according to claim 11, which has a breaking elongation of greater than or equal to 1.5%.

16. The molded article according to claim 11, which is in the form of a fiber, film, pipe or hollow body.

17. In a method of injection molding, extrusion, pultrusion or injection blowing, wherein the improvement comprises using a polyamide molding compound according to claim 1 as the material for producing a molded article.

18. The polyamide molding compound according to claim 1, which does not contain carbon back.

19. An amorphous polyamide molding compound consisting of
- 40 to 79% by weight of only one transparent amorphous polyamide, wherein the polyamide is a homo- and/or copolyamide selected from the group consisting of PA MACMI/MACMT/12, PA 6I/MACMI/12, PA 6I/6T/MACMI/MACMT, PA 6I/6T/MACMI/MACMT/12, PA MACM6/11, PA MACMI/MACM12,
- 15 to 49% by weight of at least a fibrous reinforcing material and
- 6 to 30% by weight of a particulate filler, which is a silicate, quartz, titanium dioxide, a silicic acid, magnesium carbonate, magnesium hydroxide, chalk, ground or precipitated calcium carbonate, lime, feldspar, barium sulphate, a permanently magnetic or magnetizable metal or alloy, glass balls, hollow glass balls, or a hollow spherical silicate filler or a mixture thereof, and,
- as complement to 100% by weight, at least one further additive, wherein the at least one further additive is selected from the group consisting of impact strength modifiers, bonding agents, halogen-containing flameproofing agents, halogen-free flameproofing agents, stabilizers, age-protecting agents, antioxidants, antiozonants, light protection agents, UV stabilizers, UV absorbers, UV blockers, inorganic heat stabilizers, organic heat stabilizers, conductivity additives, carbon black, optical lighteners, processing aids, nucleation agents, crystallization accelerators, crystallization inhibitors, flow aids, lubricants, mold-release agents, softeners, pigments, colorants, marking materials and mixtures thereof,
with the proviso that polyamide oligomers are excluded as additive.

* * * * *